(12) United States Patent
Ramsay

(10) Patent No.: US 11,665,236 B2
(45) Date of Patent: May 30, 2023

(54) SYSTEM, METHOD AND APPARATUS FOR COMPUTER COMMUNICATION

(71) Applicant: Sage Global Services Limited, Tyne And Wear (GB)

(72) Inventor: Mark Ramsay, Tyne And Wear (GB)

(73) Assignee: Sage Global Services Limited, Tyne And Wear (GB)

(*) Notice: Subject to any disclaimer, the term of this patent is extended or adjusted under 35 U.S.C. 154(b) by 0 days.

(21) Appl. No.: 17/876,969

(22) Filed: Jul. 29, 2022

(65) Prior Publication Data

US 2023/0037105 A1 Feb. 2, 2023

(30) Foreign Application Priority Data

Jul. 30, 2021 (GB) ...................................... 2111036

(51) Int. Cl.
*H04L 67/1095* (2022.01)
*G06F 9/54* (2006.01)
*H04L 67/60* (2022.01)

(52) U.S. Cl.
CPC .......... *H04L 67/1095* (2013.01); *G06F 9/547* (2013.01); *H04L 67/60* (2022.05)

(58) Field of Classification Search
None
See application file for complete search history.

(56) References Cited

U.S. PATENT DOCUMENTS 10,826,723 B1 * 11/2020 Strauss ............... G06F 9/45558
10,924,429 B1 * 2/2021 Gupta ................... G06F 9/5072

(Continued)

OTHER PUBLICATIONS

Friese et al., "Cross-domain discovery of communication peers: Identity Mapping and Discovery Services (IMaDS)", Jun. 1, 2017, IEEE, 2017 European Conference on Networks and Communications (EuCNC) (pp. 1-6) (Year: 2017).*

(Continued)

*Primary Examiner* — Davoud A Zand
(74) *Attorney, Agent, or Firm* — Wolf, Greenfield & Sacks, P.C.

(57) ABSTRACT

Embodiments of the present invention provide a system, comprising a first computer associated with a first service provider, a second computer associated with a second service provider, and a third computer executing a user application, wherein the third computer is arranged to obtain first registry data identifying a first endpoint associated with the first computer and second registry data identifying a second endpoint associated with the second computer; obtain, from the first endpoint, a first service resource indicative of a mapping between one or more API endpoints associated with the first computer and one or more resource types associated with the user application of the third computer, and, from the second endpoint, a second service resource indicative of a mapping between one or more API endpoints associated with the second computer and one or more resource types associated with the user application of the third computer; initiate communication with the first computer via a first API instance according to a predetermined API protocol to exchange data with the first computer in dependence on the first service resource, wherein the third computer provides a context value indicative of an identity of the user application to the first computer; initiate communication with the second computer via a second API instance according to the predetermined API protocol to exchange data with the second computer in dependence on the second service resource, wherein the third computer provides the context value indicative of the identity of the user application to the second computer.

24 Claims, 5 Drawing Sheets

(56) References Cited

U.S. PATENT DOCUMENTS

| | | | |
|---|---|---|---|
| 2013/0304903 A1 | 11/2013 | Mick et al. | |
| 2016/0092173 A1* | 3/2016 | Rodrigues | H04L 67/00 |
| | | | 717/106 |
| 2017/0111336 A1 | 4/2017 | Davis et al. | |
| 2018/0004585 A1 | 1/2018 | Mares et al. | |
| 2020/0192727 A1 | 6/2020 | Savenkov et al. | |
| 2020/0372162 A1* | 11/2020 | Kinai | G06F 21/629 |
| 2021/0097067 A1* | 4/2021 | Virtuoso | G06F 16/24524 |
| 2021/0203731 A1* | 7/2021 | Garty | H04L 41/0853 |

OTHER PUBLICATIONS

Great Britain Examination Report dated Jan. 10, 2022, in connection with Great Britain Application No. GB2111036.6.
Liu et al., Web API Search: Discover Web API and Its Endpoint with Natural Language Queries. ICWS. Sep. 2020; 12406:96-113.
GB 2111036.6, Jan. 10, 2022, Examination Report.

* cited by examiner

SYSTEM, METHOD AND APPARATUS FOR COMPUTER COMMUNICATION

RELATED APPLICATIONS

This application claims foreign priority benefits under 35 U.S.C. § 119(a)-(d) or 35 U.S.C. § 365(b) of British application number 2111036.6, filed Jul. 30, 2021, the entirety of which is incorporated herein.

BACKGROUND

It is known for a software application executing on a computer system to utilise functionality provided by other software, often executing on another remote computer system. In order to facilitate such interaction, an Application Programming Interface (API) is used to allow communication between the two computer systems. In order to allow the software application executing on one computer to use the external functionality provided by the other computer system, it is common for an API to be supported which is based on an entire breadth of potential functionality requirements for that application i.e. an API which can support any actual or potential need envisaged for the application to communicate data with the other computer system. That is, a definition for the application's API is required to support many communication needs. Whilst this approach may lead to a powerful API, capable of handling a variety of communication requirements between the computers, such APIs may be verbose and complex. As a result, data communication between the computers may be slowed and may be unreliable. The slowing of communication may be due to a need to perform more than one API call to achieve a desired functionality, whilst the unreliability may be due to an increased risk of failure when performing more than one API call. Therefore it is desired to improve one or both of a speed and reliability of communication between remote computer systems.

It is an object of embodiments of the invention to at least mitigate one or more of the problems of the prior art.

SUMMARY OF THE INVENTION

According to aspects of the present invention, there is provided apparatus and methods as set forth in the appended claims.

According to an aspect of the present invention, there is provided a system, comprising a first computer associated with a first service provider, a second computer associated with a second service provider, and a third computer executing a user application, wherein the third computer is arranged to obtain first registry data identifying a first endpoint associated with the first computer and second registry data identifying a second endpoint associated with the second computer, obtain, from the first endpoint, a first service resource indicative of a mapping between one or more API endpoints associated with the first computer and one or more resource types associated with the user application of the third computer, and, from the second endpoint, a second service resource indicative of a mapping between one or more API endpoints associated with the second computer and one or more resource types associated with the user application of the third computer, initiate communication with the first computer via a first API instance according to a predetermined API protocol to exchange data with the first computer in dependence on the first service resource, wherein the third computer provides a context value indicative of an identity of the user application to the first computer, initiate communication with the second computer via a second API instance according to the predetermined API protocol to exchange data with the second computer in dependence on the second service resource, wherein the third computer provides the context value indicative of the identity of the user application to the second computer. Advantageously the API protocol is used for communication with the first computer and the second computer which each provide a respective service, which may be different. The First and second service resources allow configuration of the API protocol for the first and second computers and the respective services.

The third computer may be arranged to initiate the communication with first computer according to the predetermined API protocol and to indicate one of an upload or download operation for the exchange of data with the first computer.

The third computer may be arranged to initiate the communication with the first computer by communicating a request to the first computer comprising an indication of the upload or download operation and the context value.

The third computer may be arranged to indicate the upload or download operation according to a HTTP POST or GET request according to the first service resource.

The third computer may be arranged to indicate to the first computer whether the upload or download operation for the exchange of the data is to be performed asynchronously or synchronously.

When the upload or download operation is to be performed asynchronously, the first computer may be arranged to provide to the third computer an indication of a resource location for the third computer to perform the upload or download operation.

The third computer may be arranged to upload or download the data with respect to the resource location.

When the upload of the data is completed, the third computer may be arranged to query processing of the data at the first computer.

The query may comprise the third computer communicating to the first computer an identical request to initiate the asynchronous communication, and to receive from the first computer an indication of a status of the processing of the data at the first computer.

The third computer may be arranged to request, from the first computer, the context value wherein said request comprises data indicative of the user application, and receive, from the first computer, the context value indicative of the identity of the user application at the first computer.

The third computer may be arranged to initiate the communication with second computer according to the predetermined API protocol and to indicate one of an upload or download operation for the exchange of data with the second computer.

The third computer may be arranged to initiate the communication with the first computer by communicating a request to the first computer comprising an indication of the upload or download operation and the context value.

The third computer may be arranged to communicate with the first computer and the second computer according to predetermined API protocol using the respective first service resource and the second service resource.

The third computer may be arranged to initiate the communication with second computer according to the predetermined API protocol and to indicate one of an upload or download operation for the exchange of data with the first computer.

The third computer may be arranged to initiate the communication with the second computer by communicating a request to the first computer comprising an indication of the upload or download operation and the context value.

The third computer may be arranged to indicate the upload or download operation according to a HTTP POST or GET request according to the first service resource.

The third computer may be arranged to indicate to the second computer whether the upload or download operation for the exchange of the data is to be performed asynchronously or synchronously.

When the upload or download operation is to be performed asynchronously, the second computer may be arranged to provide to the third computer an indication of a resource location for the third computer to perform the upload or download operation.

The third computer may be arranged to upload or download the data with respect to the resource location.

When the upload of the data is completed, the third computer may be arranged to query processing of the data at the second computer.

The query may comprise the third computer communicating to the second computer an identical request to initiate the asynchronous communication, and to receive from the second computer an indication of a status of the processing of the data at the first computer.

The third computer may be arranged to request, from the second computer, the context value wherein said request comprises data indicative of the user application, and receive, from the second computer, the context value indicative of the identity of the user application at the second computer.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention provide data communication between computer systems using an Application Programming Interface (API) protocol. The API protocol is implemented by software executing on a computer system on whose functionality is called to provide a service, i.e. service provider software, forming a service provider computer system. A software application executing on a computer system which requests additional functionality makes the request via the API of service provider computer system. The same API protocol is implemented by a plurality of service provider computer systems which may each provide a different service. Therefore, the same API protocol is used for communicating with a plurality of different service provider computer systems which thereby provides consistency for the computer system requesting external functionality. The same API protocol is used by multiple service provider computer systems, even though each may provide a different service. In embodiments of the invention, a method of utilising the API protocol is provided. Advantageously, the API protocol is flexible to support different services and, being implemented by service provider computer system, does not burden the requestor computer system i.e. more efficient operation of the computer system is enabled. Furthermore, a reliability of the communication may be improved.

Figure 1:
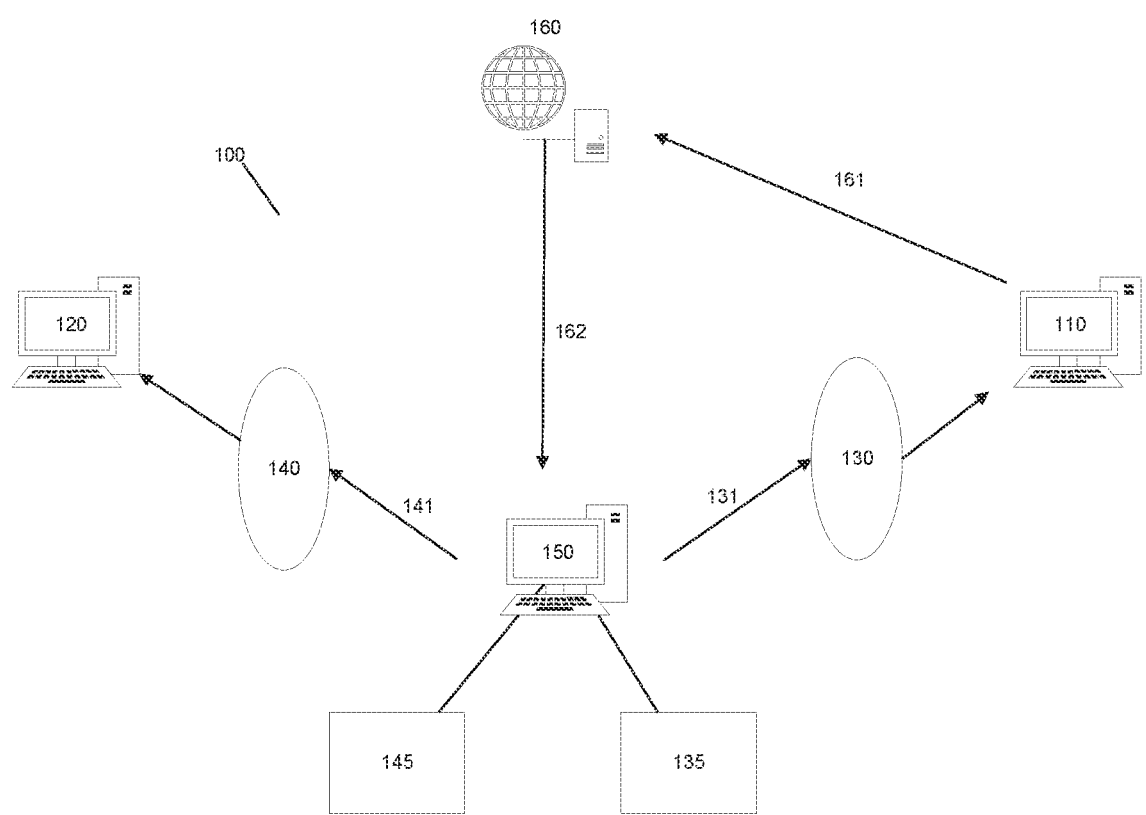
FIG. 1 shows a system according to an embodiment of the invention.

FIG. 1 illustrates a system 100 according to an embodiment of the invention. The system 100 comprises a plurality of service provider computer systems 110, 120 which each provide a respective service to one or more other computer systems 150. It will be understood that the term "computer system" is not limiting as to the type of computer system and that each of the computer systems 110, 120, 150 illustrated in FIG. 1 may be a user computer system, a server or a cloud-type computer system. In an example, the system 100 comprises a first computer system 110 and a second computer system 120 which each provide a service, as will be explained. The first and second computer systems 110, 120 may each be a respective computer server or cloud computing system providing their respective services. Hereinafter the first computer system 110 and second computer system 120 will be referred to as the first computer 110 and the second computer 120.

In the illustrated example, the system 100 comprises a third computer system 150 which executes a software application program for a user, and is referred to hereinafter as a user computer 150. The user computer 150 may directly execute the user application on one or more processors of the user computer 150. In other embodiments, the user computer 150 may be a server computer with which the user interacts using a user device i.e. execution of the user application may be performed at least partly by one or more processors of the server computer and the user may user the user device to control execution of the software on the server, such as via an interface application on the user device which may be a web browser, for example.

Thus the user computer 150 may be, for example, a desktop or portable computing device of the user or a server computer or may be a computer which directly executes the user software. In the example that follows it will be described that the user software executes on the user computer 150 with it being understood that this is merely an example and that the user software may executed by a combination of a user device and a server or cloud computer.

The user software is associated with data, which may be referred to as user data, and is stored in data storage accessible to the user computer 150. The user data may be in one or more types, referred to below as resource types, each having one or more attributes of one or more types such as numeric value, string, array. For example, a first resource type may an object comprising data types of first and second strings and an integer. A second resource may be an object comprising an integer and a string data types. A third resource may be an object comprising three strings. It will be appreciated that these are merely examples and that other types of resource may be utilised.

During execution of the user software by the user computer 150, the user software requests to use a plurality of services to perform operations with respect to the data associated with the user computer 150 i.e. user data. Thus the user computer 150 is required to communicate with other remote computers. In the example of FIG. 1, the first computer 110 is arranged to provide a first service and the second computer 120 is arranged to provide a second service. For example, one or both of the first service and the second service may comprise the respective first or second computer 110, 120 receiving, or consuming, data from the user computer 150, and producing data which is sent to the user computer 150 from the respective first or second computer 110, 120. Since the first and second computer 110, 120 provide different services, the data consumed and/or produced by each of the first and second computer 110, 120 may differ. The data consumed and/or produced may differ in that the first and second computers 110, 120 may consume and/or produce different variations, such as different versions, of the same resource type, or may consume and/or produce different resource types entirely i.e. the first computer 110 may consume the first resource type whereas the second computer 120 may consume the second resource type, as an example.

In one example, user data including at least the first resource discussed above may be communicated from the user computer 150 to the first computer 110. The first computer 110 may perform a first process upon the received data to produce the second resource which is communicated from the first computer 110 to the user computer 150. In this way the first computer 110 provides a first service for the user computer 150. The processing of the received user data i.e. the first resource may include processing at the first computer 110 to transform the received data into local data, i.e. data stored locally, or processing at the first computer 110 to transform local data to form, at least partially, the second resource.

Similarly, the user computer 150 may communicate user data to the second computer 120 which may include at least the second resource. The second computer 120 may perform a second process upon the received data to produce the third resource, which is communicated from the second computer 120 to the user computer 150. In this way the second computer 120 provides a second service for the user computer 150.

In embodiments of the invention, in order to achieve this data communication, each of the first computer 110 and second computer 120 instantiate an API according to the API protocol of an embodiment of the invention. That is, the first computer 110 and the second computer utilise respective first and second instances of the API according to the API protocol. In the example system 100 of FIG. 1, the first computer 110 is associated with a first API instance 130 according to the API protocol and the second computer 120 is associated with a second API instance 140 according to the API protocol. The first API instance 130 allows data communication between the user computer 150 and the first computer 110 and the second API instance 140 allows data communication between the user computer 150 and the second computer 120.

In embodiments of the invention, the user computer 150 initiates data communication with the first and second computers 110, 120 using the first and second API instances 130, 140, respectively. Both the first and second API instances comply with the API protocol according to an embodiment of the invention, but the first and second computers 110, 120 provide different services i.e. may receive and/or return different data in the form of, different resource types, different variants of the same resource type or the same resource types including different data. In other words, the user computer 150 requests each of the first and second computers 110, 120 to provide a respective service to the user computer 150. The service may be provided by the user computer 150 sending data to, or receiving data from the first or second computers 110, 120. The user computer 150 issues a first request 131 via the first API instance 130 to the first computer and a second request 141 to the second computer via the second API instance 140. The user computer 150 issuing requests to remote computers 110, 120 is in contrast to known arrangements whereby the user computer supports an API allowing the remote computers 110, 120 to communicate with the user computer 150.

In the example of FIG. 1, the system 100 comprises a notification service computer system 160 which allows either or both of the first and second computers 110, 120 to send respective notifications (one of which is illustrated as notification 161) to the user computer 150, as will be explained. The notification service computer 160 provides a corresponding notification 162 to the user computer as shown.

Figure 2:
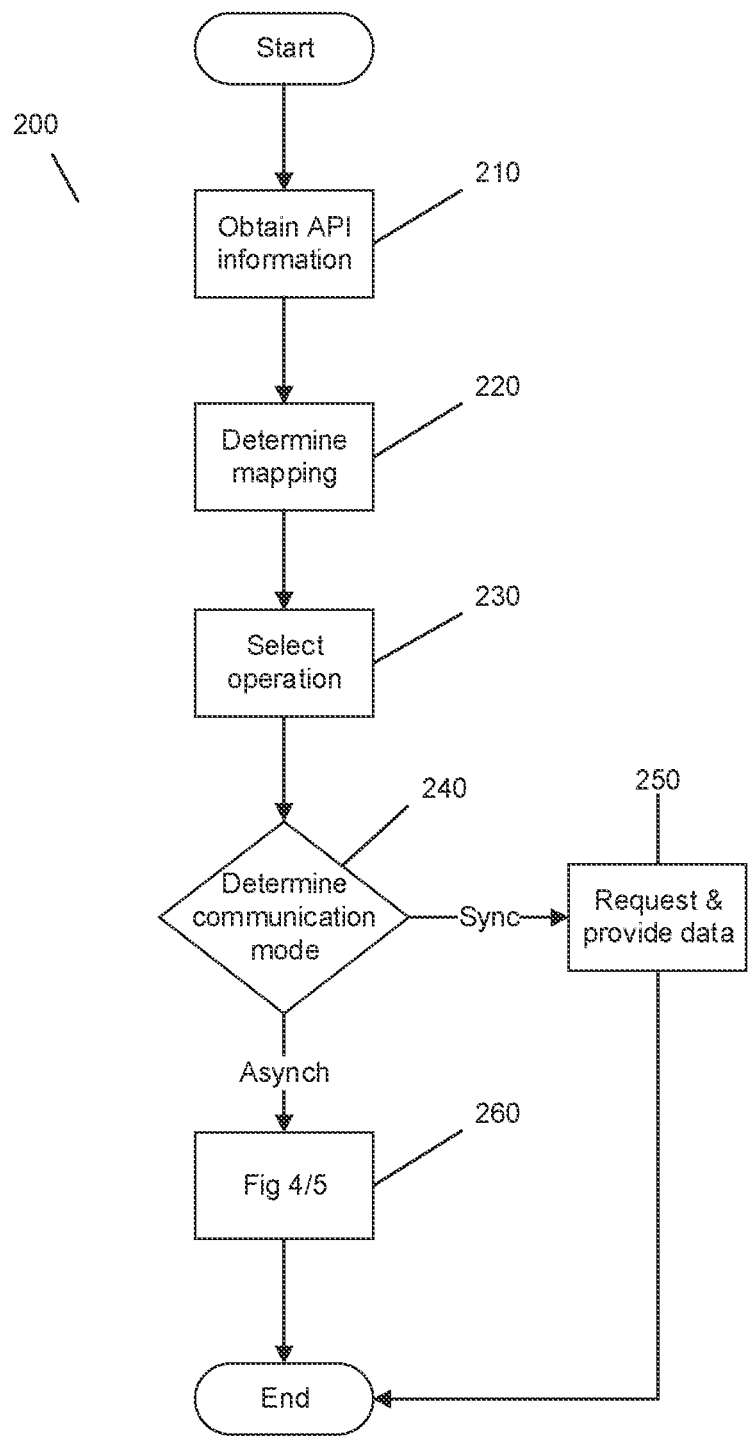
FIG. 2 shows a method according to an embodiment of the invention.

A method 200 of data communication in the system 100 of FIG. 1 will be explained with reference to FIG. 2. The method shown in FIG. 2 may be performed within the system 100 illustrated in FIG. 1. The method 200 is a method of data communication between the user computer 150 and at least one of the first and second computers 110, 120, as an example.

The method 200 comprises a block 210 of obtaining API information. Block 210 is performed by the user computer 150. The API information is information associated with the API instance 130, 140 of the at least one of the first and second computers 110, 120. In some embodiments block 210 comprises the user computer 150 obtaining registry data indicative of an endpoint associated with at least one of the first and second computers 110, 120 i.e. the first computer 110 in the described example. The user computer 150 is arranged to obtain respective registry data from each of the first and computers 110, 120. The user computer 150 may obtain first registry data 135 associated with the first computer 110, and second registry data 145 associated with the second computer 120, the first and second registry data 135, 145 being shown in FIG. 1. The first and second registry data 135, 145 may be obtained from a remote location, such as a cloud-based location. The first and second registry data 135, 145 may be obtained from a respective location which may be the same location or different i.e. each of the first and second registry data 135, 145 may be obtained from a respective, different, location. Each of the first and second computers 110, 120 may obtain an initial copy of the first and second registry data 135, 145 and may then periodically check for the first and second registry data 135, 145 being updated at the respective locations.

The first registry data 135 is indicative of a first endpoint associated with the first computer 110 and the second registry data 145 is indicative of a second endpoint associated with the second computer 120. In some embodiments, the registry data for each of the first computer and the second computer may be a respective registry data file 135, 145.

The registry data 135, 145 provides information associated with a service offered by the respective first or second computer 110, 120. In particular, the registry data 135, 145 may identify an endpoint associated with the respective one of the first computer 110 or the second computer 120. The endpoint may be identified, in some embodiments, by an endpoint address, such as a URL or http address, contained within the registry data.

Using the endpoint the user computer 150 is able to obtain an indication of one or both of data and capabilities of the respective one of the first computer 110 or the second computer 120. The indication may be obtained by the user computer 150 obtaining data in the form of a service resource from the endpoint, as discussed below. Advantageously, in this way, the user computer 150 is able to dynamically obtain an indication of one or both of the data and capabilities of the first or second computer 110, 120.

In some embodiments the registry data 135, 145 comprises identification information associated with the respective one of the first computer 110 or the second computer 120. As will be explained below, in order to increase security, embodiments of the present invention may use a cloud-based identity service in order to provide authentication. Such identity services are provided by Google, Facebook, Microsoft and Sage amongst others to allow access to online services or applications using an identifying information such as an email address and password associated with the user as part of an authentication challenge the result of which allows access to the service or application. As part of such authentication, the user software on the user computer 150 is provided with identifying information. The identifying information may be an audience value associated with the respective one of the first or second computer 110, 120. The audience value is specified in the registry data in some embodiments of the invention. As the skilled person will appreciate, a respective audience value may be assigned to each of the first and second computers 110, 120 during an authentication process.

In some embodiments, the registry data comprises an indication of an application namespace associated with the API instance. As will be explained below, the application namespace is used to determine in block 220 of the method 200 a mapping or relationship between endpoints associated with the respective one of the first computer 110 and second computer 120 and each resource type. It will be noted that the indication of the application namespace may be provided by the service resource obtained from the endpoint of the first computer 110 and second computer 120 associated with the registry data.

In block 220 of the method 200, the mapping between endpoints and each resource type is determined. The mapping may be determined by obtaining the service resource from the endpoint identified in the registry data. The endpoint provides a location from which the user computer may download the service resource from the respective one of the first computer 110 or the second computer 120.

In some embodiments, the service resource may comply with a predetermined specification, such as an OpenAPI specification (formerly Swagger) details of which may be obtained from swagger.io, although it will be appreciated that this is not limiting. The API protocol according to embodiments of the invention utilises the application namespace as mentioned above. The application namespace comprises an identification of one or more resource types. The resource types are used by the user software of the user computer 150. The service resource defines the mapping between each resource type and an endpoint associated with the one of the first computer 110 and second computer 120 which provided the service resource.

The application namespace defines one or more resource types which are supported by the user software. Each resource type defines a data structure used by the user software. The registry data or the service resource obtained from the endpoint may specify a default application namespace to be used for the API. The service resource may comprise an indication of one or more resource types which override the default application namespace. The indication may be provided by a schema object which may select a resource type from another application namespace to override the default application namespace. If no such override is identified in the service resource, then the default application namespace is used. In some embodiments, the service resource may provide an indication of mapping between an endpoint to resource type mapping which overrides the default mapping.

In some embodiments, the service resource defines each resource type in the application namespace. For example, the service resource may identify that the resource is a numeric value, string, array etc. In some embodiments, the definition of each resource may be provided by a schema identified in the service resource for the resource type.

In some embodiments, the service resource identifies operations that can be performed with respect to the resources identified. For each resource type, the service resource may provide an indication of one or a plurality of predetermined operation types such as upload and download that may be performed with respect to the API. In some embodiments, the upload and download operations may be performed by http POST and GET operations, respectively. In block 230 an operation is selected by the user computer, such as to upload or download a resource type from one of the first computer 110 or the second computer 120. The operation type is selected from operations defined in the service resource for the respective one of the first computer 110 or the second computer 120.

In the API protocol according to embodiments of the invention, a predetermined URL structure is used. The URL structure may comprise one or more of a host address, identifying information associated with the user application, identifying information associated with the application namespace and an indication of a resource type to be communicated.

The host address identifies an address of one of the first computer 110 or the second computer and may be referred to as "isv-host". The identifying information associated with the user application is a context value indicative of an identify of the user application on the user computer 150 and may be referred to as a "tenant-id". The identifying information associated with the application namespace may be indicative of a version of the application namespace "app-namespace-version", which allows an evolution of the application namespace to be supported. The indication of the resource type be to be communicated "resource" references a resource type within the used application namespace. In some embodiments, the URL structure has the form:

https://{isv-host}/{tenant-id}/{app-namespace-version}/{resource}

Advantageously providing the indication of the resource type be to be communicated within the URL structure simplifies discovery of the type of data being communicated since the data type is defined by the "resource" part of the URL.

As noted above, the URL structure may comprise the "tenant-id" which provides the context value indicative of the identity of a user instance of the user application i.e. the tenant-id provides an identity of the specific user instance communicating via the API. Prior to making a request to communicate data the user computer must obtain the context value. Therefore, embodiments of the present invention comprise the user computer 150 requesting the context value from each of the first computer 110 and the second computer 120 so that a respective context value is provided for each.

Figure 3:
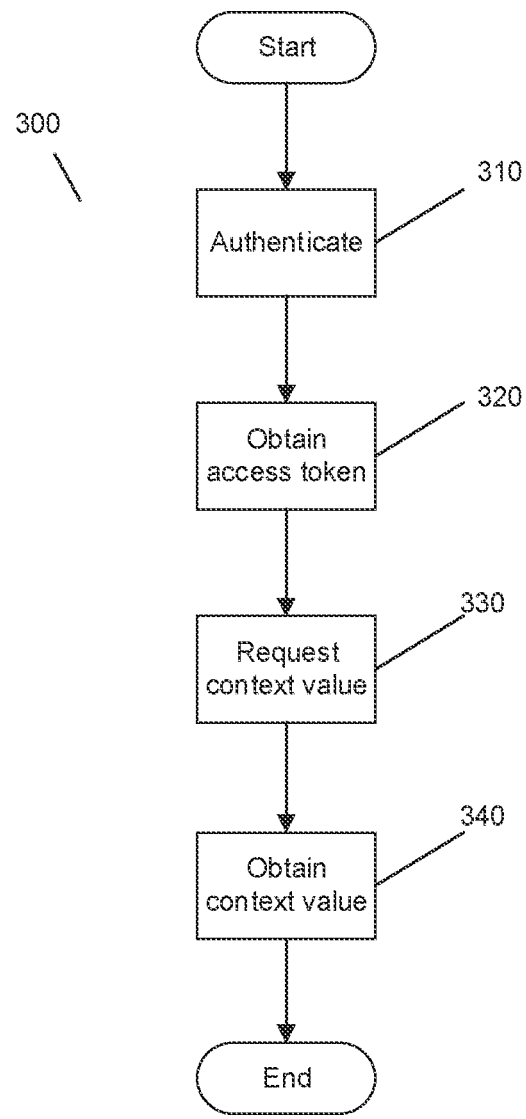
FIG. 3 shows a method of obtaining a context value according to an embodiment of the invention.

FIG. 3 illustrates a method 300 of obtaining a context value according to an embodiment of the invention.

In block 310 an authentication process is performed. The authentication process is performed between the user computer 150 and an authentication server such one provided by Google, Facebook, Microsoft and Sage or the like. The authentication process comprises an authentication challenge provided by the authentication service such as requesting a username and password from the user of the user computer 150. Upon successful completion of the authentication challenge the authentication server provides the user computer with an access token in block 320. The access token can then be used a bearer token against the first computer 110 and the second computer 120 to request the context value.

In block 330 the user computer 150 requests the context value from one of the first computer 110 or the second computer 120. In some embodiments, the access token is included within a http authorisation request, such as part of the header as the bearer token, requesting the context value. The request for context value may comprise user information associated with the user of the user computer 150. In some embodiments, the request may be of the form:

POST https://{isv-host}/tenants HTTP/1.1
Authorization: Bearer <bearer-token>
Content-Type: application/json
X-Correlation-ID: "{Caller assigned}"
X-Idempotency-Key: "{caller assigned}"
{
"compantName": "ABC Computing",
"contactName": "Joe Bloggs"
}

Where "compantName" and "contactName" provide the user information. In response, in block 340 the context value is provided by the first computer 110 or he second computer 120 to the user computer 150. As noted above, the context value may be in the form of the tenant-id which is used the API protocol according to embodiments of the invention to communicate data. The tenant-id may be a value unique to the user application which enables the first or second computer 110, 120 to identify the source of requests to communicate data.

Returning to FIG. 2, the API protocol according to an embodiment of the invention, may selectively operate in one of an asynchronous or synchronous communication mode. In block 240 of the method of FIG. 2, the communication mode of the selected operation mode is determined. The mode may be defined with respect to each resource type in the application namespace, which advantageously provides flexibility depending on the resource type. Furthermore, in some embodiments, the communication mode may be defined for each operation type, such as upload or download, identified for each resource type. For example, the service resource may identify that for a resource type an upload operation is asynchronous whilst for the download operation the operation is synchronous. In the asynchronous mode, such as upload or download, data is communicated separately from a request for the operation, whilst in the synchronous mode data is communicated with the request as will be explained.

The communication mode may be defined in the service resource associated with the resource type and operation type e.g. upload or download. In some embodiments, the communication mode is defined in the service resource by an expected HTTP response status code. In some embodiments, a HTTP response code of "200" indicates the synchronous communication mode whereas a HTTP response code of "202" indicates the asynchronous communication mode. Thus, for example, where the user computer requests to upload a particular resource type using the URL structure above with a HTTP POST operation sent to the first computer 110, the first computer responds with a HTTP ACCEPTED response having status code "200" for synchronous operation or "202" for asynchronous operation, as will be explained below in connection with FIG. 4.

If, in block 240 of the method 200 of FIG. 2, the communication mode is determined to be synchronous, the method 200 moves to block 250 wherein data communication is performed according to the synchronous mode as explained below.

If, however, the communication mode is asynchronous then data communication is performed in block 260 of the method 200, as explained below with reference to FIG. 4 or 5 depending on whether it is upload or download.

Figure 4:
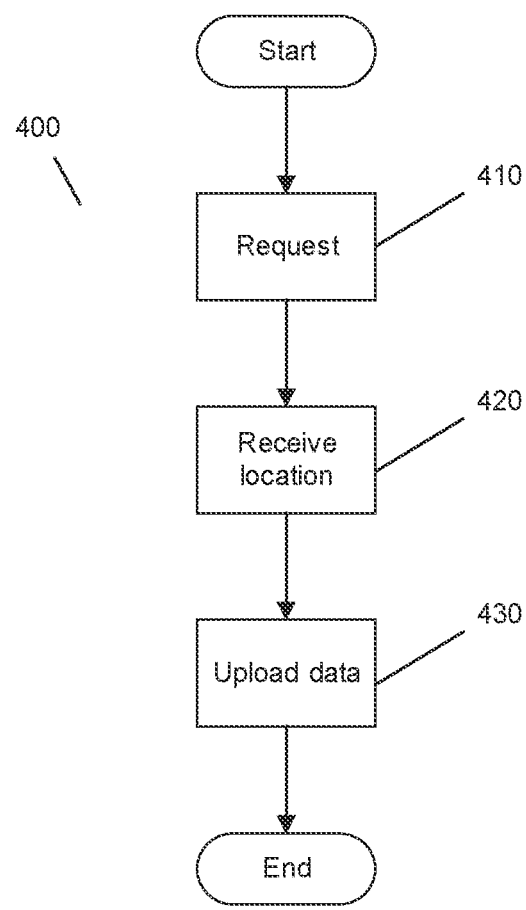
FIG. 4 shows a method of performing an asynchronous upload operation according to an embodiment of the invention.

FIG. 4 illustrates a method 400 of performing an asynchronous upload operation according to an embodiment of the invention.

The method 400 comprises a block 410 of communicating a request from the user computer 150 to the computer system providing the service supporting the request, such as one of the first computer 110 or the second computer 120. As noted above, the request may be made by means of a POST operation. The request may utilise the URL structure described above. The X-Idempotency-Key may be used to track processing of the data by the recipient computer, as will be explained.

In block 420, the user computer 150 receives a response indicative of a location of a target resource i.e. where to upload data to. As noted above, in some embodiments the response has a HTTP status code of "202" corresponding to asynchronous operation. The response may comprise one or more of the following components:

createdDateTime: A timestamp indicative of when the operation was created;
lastActionDateTime: A timestamp indicative of when a current state was entered;
status: Indicative of the operation state, which may be one of not started, running, completed or failed;
percentageComplete: indicative of a proportion of the operation performed; and
resourceLocation: provides an address to which to upload data.

It will be noted that not all of the above fields may be present. For example, percentageComplete may be omitted in some embodiments. In some embodiments, the response may have the form:

HTTP/1.1 202 ACCEPTED
Content-Type: application/json
{
"createdDateTime": "2019-09-16T12-11-23.34Z",
"lastActionDateTime": "2019-09-16T12-11-23.34Z",
"status": "notstarted",
"percentageComplete": "0",
"resourceLocation": {location to upload data to}
}

In block 430 the user computer uploads data to the recipient of the request i.e. one of the first computer 110 or the second computer 120 using the resourceLocation field of the response to determine the upload location, which may specify a destination URL.

In some embodiments one or both of the first computer 110 or the second computer 120 may support tracking. Tracking enables the user computer to determine a progress of processing of the communicated data by the recipient computer system. Once the upload of the data in block 430 has completed, the user computer 150 is able to send a further request to the first computer 110 or the second computer in response to which the user computer receives a response indicative of a completion status of the processing. In some embodiments, the user computer 150 may issue a HTTP POST request identical to that when first initiating the upload operation. In particular, the X-Idempotency-Key HTTP header field is identical to that in the prior call thereby enabling the recipient to correlate the two HTTP POST requests.

The response may be of the form below, wherein "status" indicates the status of the operation such as running or completed, as noted above, and percentageComplete indicates a level of completion.

HTTP/1.1 202 ACCEPTED
Content-Type: application/j son
Location: {ISV provided}
{
   "createdDateTime": "2019-09-16T12-11-23.34Z",
   "lastActionDateTime": "2019-09-16T12-11-28.34Z",
   "status": "running",
   "percentageComplete": "25"
}

In this way, the user computer is advantageously able to determine a completion of processing of the uploaded data.

Figure 5:
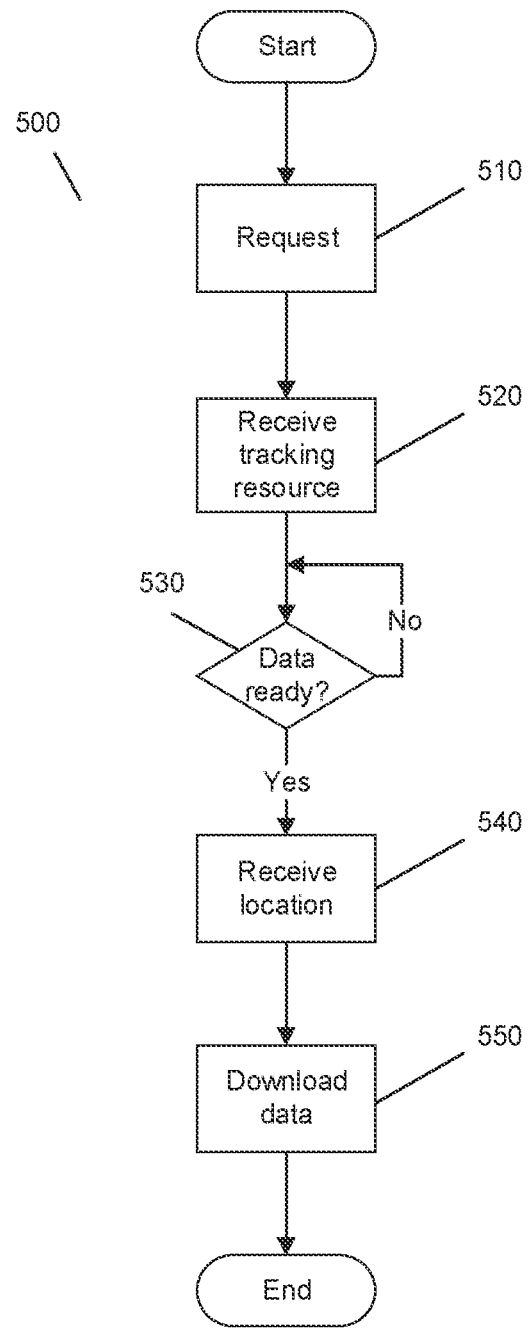
FIG. 5 shows a method of performing an asynchronous download operation according to an embodiment of the invention.

FIG. 5 illustrates a method 500 of performing an asynchronous download operation according to an embodiment of the invention.

The method 500 comprises a block 510 of communicating a request from the user computer 150 to the computer system providing the service supporting the request from which it is desired to download data, such as one of the first computer 110 or the second computer 120. As noted above, the request may be made by means of a HTTP GET operation. The request may utilise the URL structure described above. The X-Idempotency-Key is used to track processing of the data by the source computer. It is necessary to be able to determine when the requested data is available for download by the user computer 150.

In block 520 the source computer, i.e. one of the first computer 110 and the second computer 120, responds with a tracking resource. The tracking resource is received at the user computer 150. The tracking resource provides an indication of a completion of processing of the data requested for download. In some embodiments, the response also provides a location from which the requested data can be obtained which may be in the form of a URL as indicated by the "Location" field below, where "ISV provided" is indicative of the location provided by the first or second computer 110, 120. The response may have a form as below:

HTTP/1.1 202 ACCEPTED
Content-Type: application/j son
Location: {ISV provided}
{
   "createdDateTime": "2019-09-16T12-11-23.34Z",
   "lastActionDateTime": "2019-09-16T12-11-23.34Z",
   "status": "running",
   "percentageComplete": "1"
}

As can be appreciated, the percentageComplete field in the example response above indicates the processing has only recently begun and therefore the data is not yet ready.

In block 530 the user computer determines whether the data is ready for download i.e. the data has been prepared by the source computer. The tracking resource is used in block 530 to determine whether the data is ready. As explained with reference to FIG. 4 the X-Idempotency-Key is used to track processing of the data. In some embodiments a further HTTP GET request is used to update the tracking resource.

In response to reissuance of the request, the source computer responds with a response containing, for example:
"status": "running",
"percentageComplete": "10"

Which indicates that the processing is still running and not yet completed. Therefore the user computer 150 waits at block 530 until the data is available for download. Once processing is completed, the response received at the user computer 150 is indicative of completion of the processing and also provides a location in block 540, such as in the form of a URL, from which the user computer 150 can download the data.

"status": "completed",
"resourceLocation": "{location to download data from}"

It will be appreciated that in some embodiments the location may be provides separately to the indication of the processing being completed.

In block 550 the user computer 150 downloads the requested data from the source computer i.e. one of the first computer 110 or the second computer 120.

For a synchronous upload operation, a request to upload data is made by the user computer 150 which is communicated to an intended destination computer i.e. one of the first computer 110 and the second computer 120. The request may be a request using the URL format described above which uses a HTTP POST request in some embodiments. As the upload request is synchronous, the data to be uploaded is provided as part of a single request. The resource type is indicated in the URL in some embodiments and data corresponding to the resource type is provided in the body of the request. The destination computer is arranged to provide a response indicative of receipt of the data. In some embodiments, the response comprises the HTTP response code "200".

For a synchronous download operation, the user computer requests download of a resource type from a source computer i.e. one of the first computer 110 and the second computer 120. The request may be a request using the URL format described above, which in some embodiments uses a HTTP GET request. The request may include a condition on which the download is dependent. For example, the request may request data to be downloaded if the data is modified after a particular date or time. For example, the request may specify "if-modified-since: {date}".

In response, the source computer responds with the requested data. For a synchronous operation, the data requested is provided as part of the response, which may be a HTTP response in some embodiments. If the condition is not satisfied, such as the data not having been modified after the identified data, then no data is provided as part of the response. Furthermore, in some embodiments, the associated HTTP response code may be different, such as response code "304".

As discussed, the API protocol according to embodiments of the invention allow the user computer 150 to initiate communication to access services provided by each of the first and second computers 110, 120. A frequency at which the user computer 150 accesses either or both of the first computer 110 and the second computer may be relatively low, to limit load of the user computer 150 particularly where the user computer 150 is a user computing device such as a portable computing device. The system 100 illustrated in FIG. 1 comprises the notification service computer system 160 i.e. notification computer 160. Thus, for example, the first computer 110 may have prepared or obtained data that it wishes to send to the user computer 150 but must await the user computer 150 initiating communication to request the data. To reduce a likelihood of such a delay, the first and second computers 110, 120 are able in embodiments of the invention to send a notification to the notification computer 160. The notification may comprise an indication of its destination i.e. the user computer 150. The notification may comprise an indication of its source i.e. one of the first computer 110 or the second computer 120 in the example. The notification computer 160 is arranged to send the notification, or a message based thereon, to the user computer 150 to inform the user computer 150 of the data available. In this way, the user computer 150 is prompted or notified of the availability of the data without being required to speculatively initiate communication.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system, comprising:
   a first computer associated with a first service provider;
   a second computer associated with a second service provider; and
   a third computer executing a user application;
   wherein the third computer is arranged to:
   obtain first registry data identifying a first endpoint associated with the first computer and second registry data identifying a second endpoint associated with the second computer;
   obtain, from the first endpoint, a first service resource indicative of a mapping between one or more API endpoints associated with the first computer and one or more resource types associated with the user application of the third computer, and, from the second endpoint, a second service resource indicative of a mapping between one or more API endpoints associated with the second computer and one or more resource types associated with the user application of the third computer;
   initiate communication with the first computer via a first API instance according to a predetermined API protocol to exchange data with the first computer in dependence on the first service resource, wherein the third computer provides a context value indicative of an identity of the user application to the first computer; and
   initiate communication with the second computer via a second API instance according to the predetermined API protocol to exchange data with the second computer in dependence on the second service resource, wherein the third computer provides the context value indicative of the identity of the user application to the second computer.

2. The system of claim 1, wherein the third computer is arranged to initiate the communication with first computer according to the predetermined API protocol and to indicate one of an upload or download operation for the exchange of data with the first computer.

3. The system of claim 2, wherein the third computer is arranged to initiate the communication with the first computer by communicating a request to the first computer comprising an indication of the upload or download operation and the context value.

4. The system of claim 2, wherein the third computer is arranged to indicate the upload or download operation according to a HTTP POST or GET request according to the first service resource.

5. The system of claim 2, wherein the third computer is arranged to indicate to the first computer whether the upload or download operation for the exchange of the data is to be performed asynchronously or synchronously.

6. The system of claim 5, wherein when the upload or download operation is to be performed asynchronously, the first computer is arranged to provide to the third computer an indication of a resource location for the third computer to perform the upload or download operation.

7. The system of claim 6, wherein the third computer is arranged to upload or download the data with respect to the resource location.

8. The system of claim 6, wherein when the upload of the data is completed, the third computer is arranged to query processing of the data at the first computer.

9. The system of claim 8, wherein the query comprises the third computer communicating to the first computer an identical request to initiate the asynchronous communication, and to receive from the first computer an indication of a status of the processing of the data at the first computer.

10. The system of claim 1, wherein the third computer is arranged to:
    request, from the first computer, the context value wherein said request comprises data indicative of the user application; and receive, from the first computer, the context value indicative of the identity of the user application at the first computer.

11. The system of claim 1, wherein the third computer is arranged to initiate the communication with second computer according to the predetermined API protocol and to indicate one of an upload or download operation for the exchange of data with the second computer.

12. The system of claim 11, wherein the third computer is arranged to initiate the communication with the second computer by communicating a request to the second computer comprising an indication of the upload or download operation and the context value.

13. The system of claim 1, wherein the third computer is arranged to communicate with the first computer and the second computer according to predetermined API protocol using the respective first service resource and the second service resource.

14. A communication method in a computer system comprising a first computer, a second computer and a third computer, comprising:
obtaining, at the third computer, first registry data identifying a first endpoint associated with the first computer and second registry data identifying a second endpoint associated with the second computer;
obtaining, at the third computer from the first endpoint, a first service resource indicative of a mapping between one or more API endpoints associated with the first computer and one or more resource types associated with the application of the third computer and, from the second endpoint, a second service resource indicative of a mapping between one or more API endpoints associated with the second computer and one or more resource types associated with the application of the third computer;
initiating, by the third computer, communication with the first computer via a first API instance according to a predetermined API protocol to exchange data with the first computer in dependence on the first service resource, wherein the third computer provides a context value indicative of an identity of the user application; and
initiating, by the third computer, communication with the second computer via a second API instance according to the predetermined API protocol to exchange data with the second computer in dependence on the second service resource, wherein the third computer provides the context value indicative of the identity of the user application.

15. The method of claim 14, wherein the initiating, by the third computer, the communication with first computer according to the predetermined API protocol comprises indicating to the first computer one of an upload or download operation for the exchange of data.

16. The method of claim 15, wherein the initiating the communication with the first computer comprises communicating a request to the first computer comprising an indication of the upload or download operation and the context value.

17. The method of claim 15, wherein the indicating the upload or download operation comprises an indication of a HTTP POST or GET request according to the first service resource.

18. The method of claim 15, comprising indicating, by the third computer to the first computer, whether the upload or download operation for the exchange of the data is to be performed asynchronously or synchronously.

19. The method of claim 18, wherein when the upload or download operation is to be performed asynchronously, the method comprises providing, by the first computer to the third computer an indication of a resource location for the third computer to perform the upload or download operation.

20. The method of claim 19, comprising the third computer uploading or downloading the data with respect to the resource location.

21. The method of claim 19, wherein when the upload of the data is completed, the method comprises querying, by the third computer, processing of the data at the first computer.

22. The method of claim 21, wherein the querying comprises communicating from the third computer to the first computer an identical request to initiate the asynchronous communication, and receiving from the first computer an indication of a status of the processing of the data at the first computer.

23. A computer for use in a computer system comprising a first computer associated with a first service provider and a second computer associated with a second service provider, wherein the computer system is arranged to:
obtain first registry data identifying a first endpoint associated with the first computer and second registry data identifying a second endpoint associated with the second computer;
obtain, from the first endpoint, a first service resource indicative of a mapping between one or more API endpoints associated with the first computer and one or more resource types associated with the user application of the computer system, and, from the second endpoint, a second service resource indicative of a mapping between one or more API endpoints associated with the second computer and one or more resource types associated with the user application of the computer;
initiate communication with the first computer via a first API instance according to a predetermined API protocol to exchange data with the first computer in dependence on the first service resource, wherein the third computer provides a context value indicative of an identity of the user application to the first computer; and
initiate communication with the second computer via a second API instance according to the predetermined API protocol to exchange data with the second computer in dependence on the second service resource, wherein the third computer provides the context value indicative of the identity of the user application to the second computer.

24. A non-transitory computer readable medium storing computer readable instructions which, when executed by a computer in a computer system comprising a first computer and a second computer, is arranged to cause the computer to perform steps of:
obtaining, at the computer, first registry data identifying a first endpoint associated with the first computer and second registry data identifying a second endpoint associated with the second computer;
obtaining, at the computer from the first endpoint, a first service resource indicative of a mapping between one or more API endpoints associated with the first computer and one or more resource types associated with the application of the computer and, from the second endpoint, a second service resource indicative of a mapping between one or more API endpoints associated with the second computer and one or more resource types associated with the application of the computer;

initiating, by the computer, communication with the first computer via a first API instance according to a predetermined API protocol to exchange data with the first computer in dependence on the first service resource, wherein the computer provides a context value indicative of an identity of the user application; and initiating, by the computer, communication with the second computer via a second API instance according to the predetermined API protocol to exchange data with the second computer in dependence on the second service resource, wherein the computer provides the context value indicative of the identity of the user application.

* * * * *